(12) United States Patent
Puik

(10) Patent No.: US 7,364,661 B2
(45) Date of Patent: Apr. 29, 2008

(54) METHOD AND DEVICE FOR SEPARATING A MIXTURE OF FLUIDS

(75) Inventor: Eric Johannes Puik, Rijswijk (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/509,418

(22) PCT Filed: Mar. 24, 2003

(86) PCT No.: PCT/EP03/03170

§ 371 (c)(1),
(2), (4) Date: Sep. 24, 2004

(87) PCT Pub. No.: WO03/080212

PCT Pub. Date: Oct. 2, 2003

(65) Prior Publication Data

US 2005/0150842 A1 Jul. 14, 2005

(30) Foreign Application Priority Data

Mar. 25, 2002 (EP) .................................. 02252120

(51) Int. Cl.
*B01D 17/025* (2006.01)

(52) U.S. Cl. .................... 210/744; 210/800; 210/104; 210/115; 210/188; 210/533; 210/537; 210/539; 210/540; 95/253; 96/183; 96/184

(58) Field of Classification Search ............... 210/744, 210/800, 104, 112, 115, 188, 532.1, 538, 210/539, 537, 540, 533; 96/182, 183, 184; 95/253

See application file for complete search history.

(56) References Cited

U.S. PATENT DOCUMENTS

| 1,559,115 | A | * | 10/1925 | Marker et al. | ................. | 96/184 |
| 1,762,538 | A | * | 6/1930 | Worthington | ............... | 210/537 |
| 2,179,131 | A | * | 11/1939 | Millard | ....................... | 210/537 |
| 2,206,835 | A | * | 7/1940 | Combs | ....................... | 210/540 |
| 2,613,811 | A | * | 10/1952 | Archibald | .................... | 210/540 |

(Continued)

FOREIGN PATENT DOCUMENTS

EP 1044711 10/2000

(Continued)

OTHER PUBLICATIONS

International Search Report dated Jun. 26, 2003.
Kirk-Othmer, Encyclopedia of Chemical Technology, NY, 4$^{th}$ Edition, vol. 15, 1995, pp. 409-433.

*Primary Examiner*—Christopher Upton

(57) ABSTRACT

A mixture of fluids is separated into at least two phases, one of which has a higher density than the other, passing the mixture through a normally horizontal supply pipe, by creating a stratified flow in the supply pipe, by passing the mixture through an inclined pipe, whilse maintaining a stratified flow in the inclined pipe, by extracting fluid with lower density ("lighter phase") via a first discharge system and fluid with a higher density ("heavier phase") via a second discharge system, wherein the interface between the lighter phase and the heavier phase is monitored in the inclined pipe by a level controller means that varies the flow of the fluid of higher density to keep the interface between set levels.

21 Claims, 1 Drawing Sheet

U.S. PATENT DOCUMENTS

| | | | |
|---|---|---|---|
| 3,971,719 A * | 7/1976 | Peters | 210/104 |
| 4,014,791 A * | 3/1977 | Tuttle | 210/540 |
| 4,563,274 A | 1/1986 | Rothon et al. | 210/101 |
| 4,660,414 A | 4/1987 | Hatton et al. | 73/61.1 |
| 4,698,152 A | 10/1987 | Carroll | 210/96.01 |
| 4,708,793 A | 11/1987 | Cathriner et al. | 210/188 |
| 4,802,978 A * | 2/1989 | Schmit et al. | 210/104 |
| 5,064,448 A | 11/1991 | Choi | 55/38 |
| 5,149,344 A * | 9/1992 | Macy | 210/188 |
| 5,378,353 A | 1/1995 | Koch | 210/86 |
| 5,837,152 A * | 11/1998 | Komistek et al. | 210/540 |
| 5,865,992 A * | 2/1999 | Edmondson | 210/539 |
| 6,099,742 A * | 8/2000 | Komistek | 210/539 |
| 6,468,335 B1 | 10/2002 | Poldermann | 96/183 |
| 6,533,929 B2 * | 3/2003 | Binsfeld et al. | 210/539 |

FOREIGN PATENT DOCUMENTS

| | | |
|---|---|---|
| GB | 2162084 A | 1/1986 |
| GB | 2197221 A | 5/1988 |
| GB | 2326895 A | 1/1999 |
| JP | 63274408 | 11/1988 |
| RU | 2003921 C1 | 11/1993 |
| RU | 2077364 | 4/1997 |
| RU | 2119372 | 9/1998 |
| SU | 600542 | 3/1973 |
| SU | 969282 | 1/1981 |
| WO | WO9841304 | 9/1998 |

* cited by examiner

METHOD AND DEVICE FOR SEPARATING A MIXTURE OF FLUIDS

PRIORITY CLAIM

The present application claims priority on European Patent Application 02252120.7 filed 25 Mar. 2002.

Field of the Invention

The present invention relates to a method and device for separating a mixture of fluids, which are not completely mixable.

BACKGROUND OF THE INVENTION

Such mixtures appear, e.g., in the recovery of natural resources from oil and gas wells. The products of such recoveries can include mixtures of gas, oil and water. These mixtures may comprise three phases. Depending on pressures and other physical circumstances the mixtures recovered may comprise two phases, a hydrocarbon phase containing oil and optionally dissolved gas, and water. It also occurs that hardly any gas is present so that there is a two-phase mixture.

It is desirable to separate the water phase from the hydrocarbon phase before transporting the valuable products further. Thereto devices have been developed to separate such mixtures into the respective phases, and removing the water phase.

Russian patent publication No. 2 077 364 discloses a device for separating a mixture of fluids into three phases, gas, liquid of lower density and a liquid of higher density, having a feed inlet, a gas outlet, and outlets for the liquid phases. During operation of this device, a mixture of gas, low-density liquid and high-density liquid is supplied to the feed inlet of the separation device. The mixture passes upwards through an upwardly inclined supply pipe towards the inlet of a downwardly inclined pipe. In the upper end of the downwardly inclined pipe, gas is separated from the liquids that fall downwards towards the lower end of the downwardly inclined pipe. Gas, lighter liquid and heavier liquid are separately removed from the device via the respective outlets.

A disadvantage of the known separation device is that turbulence is generated in the upwardly inclined feed pipe and that counter-current flow prevails in the downwardly inclined pipe, which phenomena adversely affect the separation efficiency of the device.

European Patent Application No. 1044711 describes a device for separating a mixture of fluids into three phases; gas, lower-density liquid ("lighter liquid") and higher-density liquid ("heavier liquid"), having a feed inlet, a gas outlet, an outlet for the lighter liquid and an outlet for the heavier liquid. The device comprises:
- a normally horizontal supply pipe with the feed inlet at its upstream end;
- an inclined pipe having an inlet at its upper end that is connected to the outlet of the supply pipe and having a closed lower end;
- a gas discharge system comprising a gas riser having an inlet that is located in the gas-filled space and an outlet that is in fluid communication with the gas outlet of the device;
- a discharge system for lighter liquid having an inlet that is located in the lighter liquid-filled space and an outlet that is in fluid communication with the outlet for lighter liquid of the device; and
- a discharge system for heavier liquid having an inlet arranged below the bottom level of the supply pipe and an outlet that is in fluid communication with the outlet for heavier liquid of the device, wherein the diameter of the supply pipe is selected such that during normal operation the velocities of the liquids are below a pre-determined value, wherein the ratio of the length of the supply pipe to its diameter is larger than 10, and wherein the slope of the inclined pipe is selected such that during normal operations a stratified flow is maintained in the inclined pipe.

One of the advantages of this device over the device of the Russian patent is the maintenance of a stratified flow. However, the discharge systems, especially the discharge system for the heavier liquid is complicated. Although the design can operate at a wide range of operating conditions, it does not provide for any active flow control.

SUMMARY OF THE INVENTION

The method of the present invention provides an easy way to ensure that the different phases are withdrawn separately from the separation device. The fact that the mixture is maintained in a stratified flow is a major enabler of this accomplishment. In one embodiment the supply pipe is different from the pipeline conduit through which the mixture is fed to the separation device described. This is suitably the case when the mixture is not in a stratified flow, and the supply pipe serves then to achieve such stratified flow. In an alternative embodiment, in particular when the mixture is already in a stratified flow, the supply pipe is the same as the pipeline conduit. Applicant had found that stratified flow in the supply conduit can be maintained if the diameter of the supply pipe is selected such that during normal operation the velocities of the liquids are below a pre-determined value, and if the ratio of the length of the supply pipe to its diameter is larger than 5, especially larger than 10. Applicant has further found that the slope of the inclined pipe can be selected such that during normal operations a stratified flow is maintained in the inclined pipe. Suitably, the slope of the inclined pipe ranges between 1 and 5, preferably between 1 and 3° from the horizontal plane. The stratified flow makes it possible to use a level monitor to determine where the interface between the heavier and the lighter phases is. Via the first or second discharge system the level can then be adjusted. Preferably one employs a level controller in combination with a valve as the level controller means in the first and/or second discharge system.

The second discharge system must be in fluid communication with the heavier phase in the inclined pipe. A skilled artisan will realize that the location of this discharge system can be along any place of the inclined pipe. Most conveniently, the second discharge system is at the downstream end of the inclined pipe.

It is a further embodiment of the present invention to provide a separation device that can be used in the current method. Accordingly, the present invention also provides a device for separating a mixture of fluids into at least two phases, one of which has a higher density than the other, so that a phase of fluid of lower density ("lighter phase") and a phase of fluid of higher density ("heavier phase") are obtained, which device comprises:
- a normally horizontal supply pipe with a feed inlet at its upstream end and an outlet at its downstream end;
- an inclined pipe having an inlet at its upper end that is connected to the outlet of the supply pipe;

a first discharge system having an inlet that is located such that is in fluid communication with the lighter phase; and a second discharge system located at the inclined pipe and having an inlet that is in fluid communication with the heavier phase, wherein the inclined pipe is provided with a level controller means comprising a level monitor and a valve at the first and/or second discharge system.

A skilled artisan will realise that many types of level monitors can be used. Examples of such level monitors include floating devices or segmented monitors. Other examples are dip sticks, magnetic level liquid indicators, conductivity- or capacitance-based devices and ultrasonic level devices. An overview of suitable devices has been described in Kirk-Othmer, Encyclopedia of Chemical Technology, John Wiley, New York, 4th ed. Vol. 15, 1995, pp 409-433. The level monitors and the valves may be operated via a computer-directed system.

BRIEF DESCRIPTION OF THE DRAWING

The invention will now be described by way of example in more detail with reference to the accompanying drawings, wherein.

DETAILED EMBODIMENT OF THE INVENTION

Figure 1:
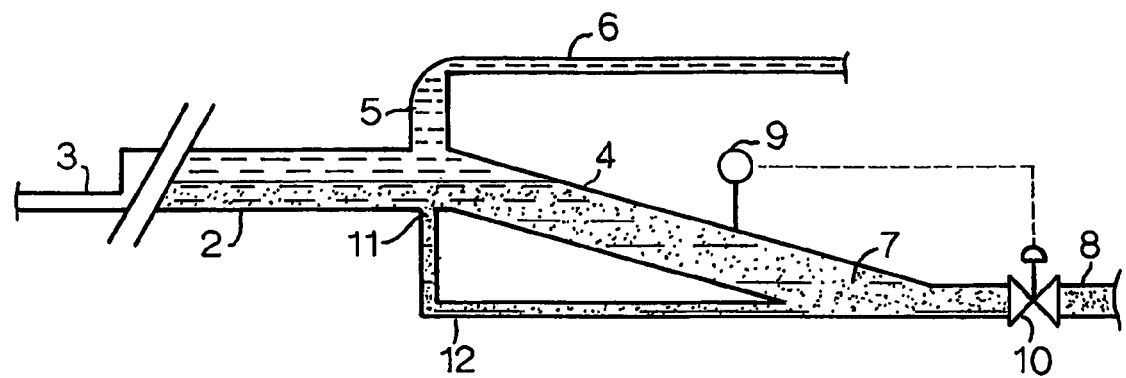
FIG. 1 shows schematically a first embodiment of the invention.

Reference is made to FIG. 1. A device 1 for separating a mixture of fluids in two phases is shown. It contains a horizontal supply pipe 2. At the upstream side thereof it has an inlet that is connected to a pipeline 3 that feeds the device with the mixture. It is noted that in this embodiment the supply pipe 2 ensures a stratified flow that is not present in pipeline 3. At its downstream end it is connected to an inclined pipe 4. In the pipe 2 a stratified flow is created and in inclined pipe 4 such stratified flow is maintained so that two distinct phases are apparent; one lighter phase of fluid with a lower density and a heavier phase with a fluid of higher density. The device 1 also comprises a first discharge system 5, the inlet of which is in fluid communication with the lighter phase. The discharge systems results in a discharge pipe 6 through which the low-density fluid is discharged. The inclined pipe 4 ends in a second discharge system 7 that boils down to an outlet through which the high-density fluid is passed into a discharge pipe 8. The interface between the two phases is monitored via a level controller 9. If the level controller 9 indicates that the interface goes beyond preset levels, it causes a valve 10 to adjust the flow of higher-density fluid through the discharge pipe 8, in order to bring the interface back to the preset level range. The valve 10 is positioned in the discharge pipe 8. It is also possible to place the valve at the outlet of the inclined pipe or at the lower end of the inclined pipe.

In an embodiment where the flow rate of higher-density fluid is relatively high in comparison to the flow of the low-density fluid, it is suitable to extract the fluid of higher-density via a further discharge system having a further outlet (11) that is in fluid communication with the heavier phase. Preferably, the further outlet 11 is arranged in the bottom of the horizontal supply pipe. The higher-density fluid is then suitably withdrawn via the outlet 11 through a discharge pipe 12. Suitably, this flow of higher-density fluid is combined with the higher-density fluid withdrawn from the second discharge system 7 in discharge pipe 8. It is preferred to have the valve positioned in the second discharge system. An additional control means is suitably arranged such that the pressure of the lighter phase in the first system is monitored, and the flow of fluid of lower density is adjusted in accordance with the pressure measured. Although it is possible to arrange the flow adjustment of the heavier phase in accordance with the pressure measured, it is preferred from a pragmatic viewpoint to adjust the flow of low-density fluid.

Figure 2:
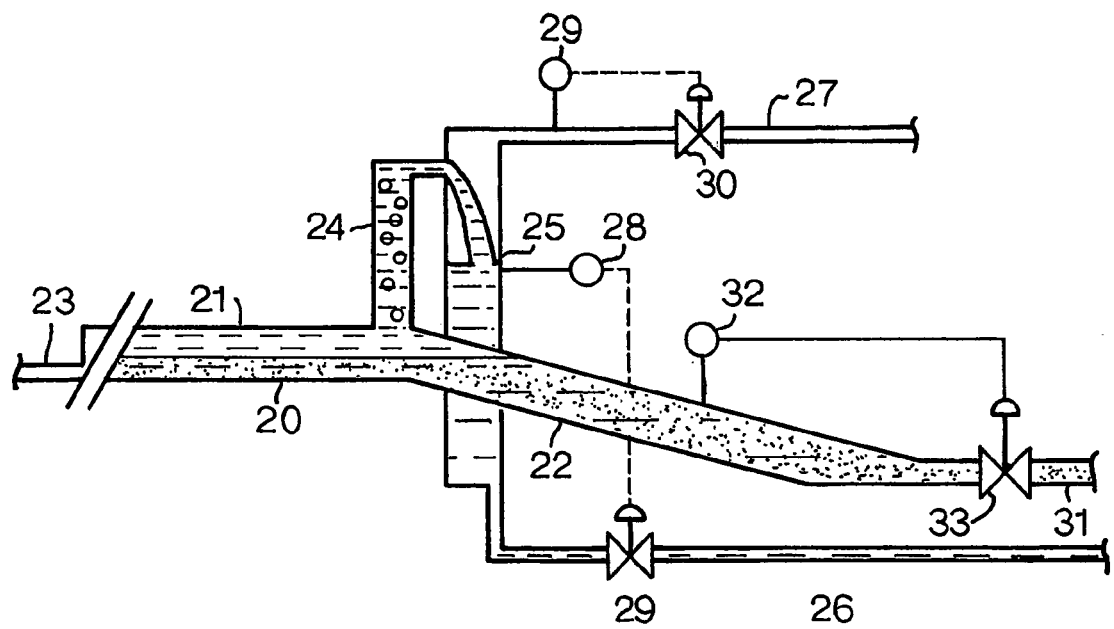
FIG. 2 shows schematically a second embodiment of the invention.

The device and method are suitable employed in the production of hydrocarbons, in which production also water is recovered. Hence the lighter phase in the present-method comprises suitably oil, and the heavier phase comprises suitably water. In a number of occasions the well from which hydrocarbons are produced yield liquid hydrocarbon oil, water and gas. In such instances it is advantageous to separate the water from the liquid and gaseous hydrocarbons. Thereto, the present invention suitably provides a method in which three phases are separated into a phase of fluid of lower density ("lighter phase"), a phase with fluid of intermediate density ("intermediate phase") and a phase with fluid of higher density ("heavier phase"). The lighter phase suitably comprises gas, the intermediate phase comprises oil and the heavier phase comprises water. Although in principle it is possible to withdraw the combination of the intermediate and the heavier phases together via the second discharge system, it is preferred to withdraw the lighter phase and the intermediate phase via the inlet of the first discharge system. Reference is made to FIG. 2, wherein the device 20 comprises a horizontal supply pipe 21 and an inclined pipe 22. A mixture of gas, oil and water is fed to the device 20 via a pipe 23. A riser 24 is in fluid communication with the lighter and the intermediate phases, i.e. gas and oil. The lighter and intermediate phases are withdrawn from the horizontal pipe, and the withdrawn phases are suitably passed to the riser section 24 to allow the lighter phase and the intermediate phase to separate. The combined phases may be withdrawn from the riser section 24 in any known manner. One can pass the combined phases directly to a discharge conduit (not shown). It is also possible to withdraw the lighter phase from the upper part of the riser section and the intermediate phase from a lower part of the riser section (not shown). It is preferred to provide a riser section that comprises two vessels, and pass the combination of the lighter and intermediate phases from a first vessel 24 to a second vessel 25. Vessel 25 can have the shape of a vessel as shown in the figure, but it will be clear that also other shapes, such as a short (horizontal) pipeline section can be used. In this second vessel 25 the phases clearly separate. The lighter phase is then withdrawn from the top of the second vessel 25 via a conduit 27, and the intermediate phase is withdrawn from the bottom of the second vessel 25 via a conduit 26. Suitably, the interface between the lighter phase and the intermediate phase is monitored by a second level controller means 28 that adjusts the flow of the fluid of intermediate density to keep the interface between set levels using a valve 29 arranged in the discharge pipe 26. Although not necessary, it is sometimes economic to combine both phases from pipes 26 and 27 for further transport.

In this method the second level controller 28 is arranged at the second vessel 25 to monitor the interface between the lighter and intermediate phases. Suitably, the level controller 28 communicates with a valve 39, arranged in the conduit 26 for the fluid of intermediate density, to control the flow of fluid of intermediate density. The skilled artisan will realise that it is possible to arrange a similar valve in the discharge conduit 27 to control the flow of fluid of lighter density, and have that valve governed by the level controller 28. An alternative embodiment is to have one or more similar level controllers communicate valves in both discharge pipes to control both flows. It is further advantageous to arrange a pressure monitor 29 at the discharge pipe 27 that communicates with one or more flow control valves (30) in the first discharge system for control of the flow of the fluid of lower density. Alternatively, the pressure controller 29 may communicate with a valve in discharge pipe 26 to control the flow of fluid of intermediate density. A further embodiment provides communication of the pressure controller with two valves in pipes 26 and 27 to control both flows. In FIG. 2 only a valve 30 is shown in the discharge conduit 27 for the fluid of lower density. In this way the pressure in the riser section (24,25) is monitored and the flow of the fluid of lower density, or the flow of fluid of intermediate density or both flows are adjusted in accordance with the pressure measured. The high-density fluid, e.g. water, is withdrawn from the inclined pipe 22 via a discharge pipe 31. The level between the intermediate and heavier phases is monitored by a level controller 32 that is in communication with a valve 33, arranged in discharge pipe 31. The system of level controller 32 and valve 33 operates similarly to the equivalent system described for FIG. 1.

The following is an example of the separation device wherein reference is made to the embodiment of FIG. 2.

A mixture of gas, oil and water is fed via a tube of 10" (254 mm) internal diameter to the separation device 20. The horizontal supply pipe 21 and the inclined pipe 22 have an internal diameter of 48" (1.2 m). Therefore the superficial liquid velocity in the device is reduced by a factor of about 24. The length of the horizontal supply pipe and that of the inclined pipe may range from 12 to 100 m, and from between 15 and 120 m, respectively. It is again emphasised that the length of the supply pipe is not relevant as long as a stratified flow is created in the supply pipe. If the mixture is fed through a pipeline conduit in a stratified flow, the supply pipe can be as long as many tens of kilometres. The temperature of the mixture varies between 60 to 85° C. and the pressure may be varied between 25 and 85 bar. Suitably the level monitor is in the middle of the inclined section. That could be at about 10 m downstream of the riser section. Under the conditions described about 10,000 to 20,000 m$^3$ of the mixture per day can be passed through the separation device.

While the illustrative embodiments of the invention have been described with particularity, it will be understood that various other modifications will be readily apparent to, and can be easily made by one skilled in the art without departing from the spirit of the invention. Accordingly, it is not intended that the scope of the following claims be limited to the examples and descriptions set forth herein but rather that the claims be construed as encompassing all features which would be treated as equivalents thereof by those skilled in the art to which this invention pertains.

We claim:

1. A method for separating a mixture of fluids into at least two phases, one of which has a higher density than the other, which method comprises:
    passing the mixture through a normally horizontal supply pipe with a feed inlet at its upstream end and an outlet at its downstream end;
    subsequently, passing the mixture through an inclined pipe having an inlet at its upper end that is connected to the outlet of the supply pipe, whilst maintaining a stratified flow in the inclined pipe so that the phase of fluid of lower density ("lighter phase") is above the phase of fluid of higher density ("heavier phase");
    extracting fluid with the lower density via a first discharge system having an inlet that is located such that is in fluid communication with the lighter phase;
    extracting fluid of higher density via a second discharge system located at the inclined pipe and having an inlet that is in fluid communication with the heavier phase; and
    wherein the interface between the lighter phase and the heavier phase is monitored in the inclined pipe by a level controller means that varies the flow of the fluid of higher density to keep the interface between set levels;
    wherein the fluid of higher density is extracted via a further discharge system having a second outlet that is in fluid communication with the heavier phase;
    wherein the second outlet is arranged in the bottom of the horizontal supply pipe.

2. The method of claim 1, wherein the level controller means comprises a level monitor and a valve at the first and/or second discharge system.

3. The method of claim 1, wherein the supply pipe is the same as the pipeline conduit through which the mixture to be separated is fed.

4. The method of claim 1, wherein the pressure of the lighter phase in the first discharge system is monitored, and the flow of fluid of lower density is adjusted in accordance with the pressure measured.

5. The method of claim 1, wherein the lighter phase comprises oil, and the heavier phase comprises water.

6. The method of claim 1, wherein a third phase with fluid of intermediated density ("intermediated phase") is further seprated.

7. The method of claim 6, wherein the lighter phase comprises gas, the intermediate phase comprises oil and heavier phase comprises water.

8. The method of claim 6, wherein the lighter phase and the intermediate phase are withdrawn via the inlet of the first discharge system.

9. The method of claim 6, wherein the withdrawn phases are passed to a riser section to allow the lighter phase and the intermediate phase to separate.

10. The method of claim 9, wherein the lighter phase is withdrawn from the riser section at the upper level of the riser section, and the intermediate phase is withdrawn from the riser section at the lower level of the riser section.

11. The method of claim 9, wherein the riser section comprises a first vessel in communication with said horizontal supply pipe and a second vessel communication with said first vessel.

12. The method of claim 9, wherein the interface between the lighter phase and the intermediate phase is monitored by a second level controller means in the riser section that adjusts the flow of the fluid of lower density to keep the interface between set levels.

13. The method of claim 12, wherein the second level controller means communicates with valves that control the flow of the fluid of lower density or the flow of the fluid of intermediate density or both flows.

14. The method of claim 6, wherein the pressure in the riser section is monitored and the flow of the fluid of lower density, or the flow of fluid of intermediate density or both flows are adjusted in accordance with the pressure measured.

15. A device for separating a mixture of fluids into at least two phases, one of which has a higher density than the other, so that a phase of fluid of lower density ("lighter phase") and a phase of fluid of higher density ("heavier phase") are obtained, which device comprises:
- a normally horizontal supply pipe with a feed inlet at its upstream end and an outlet at its downstream end;
- an inclined pipe having an inlet at its upper end that is connected to the outlet of the supply pipe;
- a first discharge system having an inlet that is located such that is in fluid communication with the lighter phase;
- a second discharge system located at the inclined pipe and having an inlet that is in fluid communication with the heavier phase, wherein the inclined pipe is provided with a level controller means comprising a level monitor and a valve at the first and/or second discharge system and;
a further discharge system having a second outlet that is in fluid communication with the heavier phase; wherein the second outlet is arranged in the bottom of the horizontal supply pipe.

16. The device of claim 15, wherein the first discharge system is provided with a pressure monitor that communicates with a flow control valve located in the first discharge system.

17. The device of claim 15, wherein the first discharge system comprises a riser section to allow the lighter phase and a phase with fluid of intermediate density ("intermediate phase") with a density higher than the density of the lighter phase but lower than the density of the heavier phase to separate, which riser section has an outlet for the lighter phase in the upper part and an outlet for the intermediate phase in the lower part.

18. The device of claim 17, wherein the riser section comprises a first vessel in communication with said horizontal supply pipe and a second vessel in communication with said first vessel.

19. The device of claim 17, wherein the riser section has been provided with a second level controller means that adjusts the flow of the fluid of lower density to keep the interface between set levels.

20. The device of claim 19, wherein the second level controller means communicates with one or more valves at the respective discharge systems, which valve(s) control(s) the flow of the fluid of lower density or the flow of the fluid of intermediate density or both flows.

21. The device of claim 17, wherein the riser section is provided with a pressure monitor that communicates with one or more flow control valves for control of the flow of the fluid of lower density, or the flow of fluid of intermediate density of both flows.

* * * * *